(12) United States Patent
Siomina et al.

(10) Patent No.: US 9,173,077 B2
(45) Date of Patent: Oct. 27, 2015

(54) METHOD IN A UE, A NETWORK NODE AND A CLIENT NODE IN A WIRELESS COMMUNICATIONS NETWORK

(75) Inventors: Iana Siomina, Solna (SE); Torbjörn Wigren, Uppsala (SE); Michael Anderson, Alpharetta, GA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 130 days.

(21) Appl. No.: 13/992,975

(22) PCT Filed: Apr. 28, 2011

(86) PCT No.: PCT/SE2011/050523
§ 371 (c)(1),
(2), (4) Date: Jun. 10, 2013

(87) PCT Pub. No.: WO2012/082045
PCT Pub. Date: Jun. 21, 2012

(65) Prior Publication Data
US 2013/0252649 A1    Sep. 26, 2013

Related U.S. Application Data

(60) Provisional application No. 61/424,184, filed on Dec. 17, 2010.

(51) Int. Cl.
H04W 4/14        (2009.01)
H04W 4/02        (2009.01)
H04W 4/22        (2009.01)
G01S 5/02        (2010.01)
G01S 19/34       (2010.01)
H04W 8/22        (2009.01)
H04W 64/00       (2009.01)
(Continued)

(52) U.S. Cl.
CPC ........ H04W 4/14 (2013.01); H04W 4/02 (2013.01); H04W 4/22 (2013.01); G01S 5/0205 (2013.01); G01S 19/34 (2013.01); H04W 8/22 (2013.01); H04W 64/00 (2013.01); H04W 76/007 (2013.01); H04W 76/02 (2013.01)

(58) Field of Classification Search
CPC ....................................................... H04W 4/14
USPC .................................... 455/466, 404.1, 404.2
See application file for complete search history.

(56) References Cited

U.S. PATENT DOCUMENTS 8,260,250 B2 *  9/2012  Busin et al. ................ 455/404.2
8,295,801 B2 * 10/2012  Ray et al. .................... 455/404.1
(Continued)

FOREIGN PATENT DOCUMENTS

WO    WO2009021556    2/2009

Primary Examiner — Cong Tran

(57) ABSTRACT

A method and nodes for enabling a client node such as a Public Safety Answering Point (PSAP) or Location Services (LCS) client to set up a communication to a User Equipment (UE) in a wireless communications network. The method enables the client node to provide solutions that enable location aware non-voice based emergency services by means of new signalling and a new architecture. A text message may be sent from the UE to the client node via a network node, wherein the text message includes UE location information and a client indicator. The UE location information and the client indicator are then utilized to determine a client node which is most appropriate for communication with the UE.

19 Claims, 7 Drawing Sheets

(51) Int. Cl.
*H04W 76/00* (2009.01)
*H04W 76/02* (2009.01)

(56) References Cited

U.S. PATENT DOCUMENTS

| | | | |
|---|---|---|---|
| 8,509,731 B2 * | 8/2013 | Kholaif et al. | 455/404.2 |
| 8,594,015 B2 * | 11/2013 | Dunn et al. | 370/328 |
| 8,606,218 B2 * | 12/2013 | Ray et al. | 455/404.1 |
| 8,712,366 B2 * | 4/2014 | Greene et al. | 455/404.1 |
| 2004/0176123 A1 | 9/2004 | Chin | |
| 2005/0282518 A1 | 12/2005 | D'Evelyn et al. | |
| 2007/0223444 A1 * | 9/2007 | Foo et al. | 370/349 |
| 2008/0081646 A1 | 4/2008 | Morin et al. | |
| 2009/0298478 A1 * | 12/2009 | Tyhurst et al. | 455/414.1 |
| 2010/0002846 A1 | 1/2010 | Ray et al. | |
| 2010/0069099 A1 | 3/2010 | Dunn et al. | |
| 2010/0330987 A1 * | 12/2010 | Lee | 455/432.1 |
| 2012/0134345 A1 * | 5/2012 | Tamhankar et al. | 370/338 |

* cited by examiner

METHOD IN A UE, A NETWORK NODE AND A CLIENT NODE IN A WIRELESS COMMUNICATIONS NETWORK

TECHNICAL FIELD

The present disclosure relates to a method in a network node, to a method in an user equipment and to a method in a client node of a wireless communications network. In particular the disclosure relates to procedures for setting up a communication between user equipment and a client node based on information in a text message sent from the user equipment.

BACKGROUND

Short Messaging Service (SMS) was introduced in 1985 into the 3GPP GSM series of standards for sending messages of up to 160 characters (including spaces) to and from GSM mobile handsets. The initial idea behind SMS was to use a telephony-optimized system, such as GSM, to transport messages on the signalling paths used to control the telephony traffic during time periods when no signalling traffic existed. What was not predicted was the massive shift in social behaviour in following years. Instant Messaging (IM) on PCs shifted a younger generation away from voice calls to text-based communications with its own specialized vocabulary. Later, SMS was adopted for enterprises, content delivery, and entertainment services involving SMS, e.g., TV voting. Using SMS in combination with various location-based services (LBS) applications, such as location-based mobile advertising, has been used in the wireless market, e.g., for delivering discounts to mobile subscribers near advertised restaurants or cinemas. Location information has also been used by emergency call routing entities to route an emergency call to the appropriate (Public Safety Answering Point) PSAP with the minimum delay.

Enhanced Messaging Service (EMS) is based upon standard SMS, but with formatting added to the text. The formatting permits the message to contain animations, pictures, melodies, formatted text, vCard, vCalendar, and Wireless Vector Graphics objects. Such objects may be mixed together into one message.

In the 3GPP standards, SMS is a service described for Public Land Mobile Networks (PLMN) which transfers short messages between a GSM/UMTS mobile station (MS)/user equipment (UE) and a Short Message Entity (SME) via a Service Centre (SC). An SME is an entity which may send or receive Short Messages. The SC normally serves as an interworking and relaying function of the message transfer between the MS and the SME. The SMS service also supports the interchange of short messages between the MS and email servers, which involves Email-to-SMS gateways.

3GPP technical specification TS 23.040 specifies point-to-point and cell broadcast SMS services. The cell broadcast (specified in 3GPP technical specification TS 23.041) is a technology that allows a text or binary message to be defined and distributed to all mobile terminals connected to a set of cells. Cell Broadcast Entities (CBEs) are connected to the Cell Broadcast Centre (CBC). Cell Broadcast messages are then sent from the CBCs to the cells in accordance with the CBC's coverage requirements. Advanced infrastructures make use of Geographic Information System (GIS)-based interfaces for definition of the used areas.

The SMS normally comprises 8 elements particular to the submission and reception of messages:
 Validity Period (indicates the time period for which the short message is valid, i.e. for how long the SC shall guarantee its existence in the SC memory before delivery to the recipient has been carried out);
 Service Centre Time Stamp (the time of arrival of the short message at SC);
 Protocol Identifier (either a reference to the higher layer protocol being used, or interworking with a certain type of telematic device);
 More Messages to Send (true when there is one or more messages waiting in that SC);
 Priority (information element provided by an SC or SME to indicate to the PLMN whether or not a message is a priority message; Delivery of a priority message shall be attempted irrespective of whether or not the MS has been identified as temporarily absent, or having no free memory capacity);
 Messages Waiting (in case of previous unsuccessful delivery attempt(s) due to temporarily absent mobile or MS memory capacity exceeded, the service element enables the PLMN to provide the HLR, SGSN and VLR with which the recipient MS is associated with the information that there is a message in the originating SC waiting to be delivered to the MS);
 Alert SC (the service element, which may be provided by some GSM/UMTS PLMNs to inform the SC that an MS is again ready to receive one or more short messages so that the SC may—on reception of an Alert SC—initiate the delivery attempt procedure for the queued messages destined for this MS); and
 MT Correlation ID (service element used to verify from where the message is received originated; used only when the HPLMN of the receiving MS is using an SMS Router or an IP-SM-GW).

SMS may be implemented in different systems and be based on different technologies, such as SMS over IP or SMS over Service Gateways (SGs).

3GPP is in the process of studying a long-term approach to address the need for non-voice emergency services, but it may be several years before this long-term approach is available in the market place. This time frame does not solve the more immediate needs for people with disabilities. There are approaches for SMS to 911 communications targeting near-term intermediate approaches. But they are primarily focused on the upgrades to support interactions on the PSAP side of the communications interface and do not address the end-user devices, the originating wireless networks, and ultimately the SMS shortcomings and limitations (e.g. security, latency, routing etc.).

One of such possible alternatives to these near-term SMS to 911 approaches is to use Terminal Type (TTY) communications with the PSAP without requiring users to attach a separate TTY terminal to their mobile devices. This alternative is commonly called "TTY Emulation". TTY Emulation establishes a standard circuit-switched emergency voice call, and uses the media path to transmit and receive characters as TTY tones (typically Baudot tones). TTY emulation re-uses emergency voice services, including high reliability, low latency, priority handling and other features. However, one of the recognized challenges with the TTI emulation approach is that generally it is more reliable to transmit and receive signalling between the mobile and base station instead of audible tones.

Another approach is to place a voice call to 911, so that PSAP call taker can identify the caller as one who cannot use speech and is registered for SMS; then the PSAP call taker initiate an SMS text message to that caller. Since the SMS is delivered over the associated control channel that exists as part of the voice call, this eliminates some of the limitations with SMS as the MSC does not have to perform the "paging" process to deliver the SMS. In addition, since there is a voice call established, the normal routing and location capabilities of the voice call are available, eliminating some of the other limitations with SMS. Some disadvantages of this approach, are the inherited SMS "store and forward" nature and the requirement that the user is able to read and send an SMS while on a voice call which is inconvenient and not always possible.

Another approach is real time text where the text is transmitted character by character as the user types the message. Real time text provides a functionality which is not possible with store-and-forward SMS systems enabling conversations equivalent to voice conversations, so that the conversation can be followed closely and that immediate interaction takes place. Real time text requires an IP data connection, as the messages are transported over IP protocols. Capabilities such as automatic routing and location are not defined.

Publication, WO2009021556 (A1), discloses yet another approach. According to this approach emergency information is added as a postfix to the emergency call number. The emergency information may comprise; position indication, ability to voice answer, indication of accompanying SMS, automated alarm etc. and is added as postfix to the emergency number by the phone. The network entry node takes care of separation of dialled emergency number and emergency information, to enable normal set-up of the emergency call connection trough the network to the emergency centre where the emergency information is presented to the emergency operator.

The following describes some of the problems with known approaches. First, there are no network-based messaging-based emergency services in deployed or standardized cellular networks. Emergency positioning (e.g., positioning for E-911 calls in North America or 112 in Europe) is a regulatory requirement in the US. Emergency positioning is typically triggered by setup of an emergency call, i.e., someone dialling the emergency number (911 in the example) on a cell phone. A voice communication between the user and the Public Safety Answering Point (PSAP) is then setup. Such an emergency service may not be feasible for example for people with speech disabilities. Furthermore, there could also be a problem in cases where the 911 call is placed because of a user of the cell phone is being under threat and voice communication with PSAP clients/agents is not possible. Such situations may in fact prevent users from dialling 911 to get assistance, e.g., by the Police. In addition, emergency numbers may also be busy due to a capacity limit, e.g., in a mass disaster situation, and the network capacity is much smaller for voice calls than for messaging services.

Other problems with prior art is that there is no possibility to guarantee caller's identification and delivery. First, it is e.g. possible to spoof SMS messages and make them appear to come from other people's mobile devices. Secondly, SMS is a best-effort service i.e. is it possible to guarantee the delivery and obtain any indication from PSAP about the received or read SMS.

Another problem with prior art solutions is that, no solution provides a possibility to ensure that all messages from a sequence of SMS messages, fragmented or not, within the same emergency session are routed to the same PSAP. Neither the mobile device nor the network has any association between two SMSs sent from the same mobile device, since SMS is a discrete message. As it is now, SMSs may be routed to a different PSAP if the subscriber moves to another location.

SUMMARY

Thus, there is need for an emergency services procedure which makes it possible for people with some kind of disabilities e.g. speech disabilities, to reach a PSAP that can help them, and which procedure is reliable and secure.

It is therefore an object to provide a methods and nodes for enabling a client node (PSAP, LCS client etc) to set up a communication to a User Equipment (UE) in a wireless communications network and to provide a solution that enables location aware non-voice based emergency services by means of new signalling and architecture.

In an example of an embodiment, the object is achieved by a method in a network node for enabling a client node of setting up a communication to a UE in a wireless communications network, wherein the method comprises: receiving a text message comprising UE location information and a client indicator; identifying a client node based on the UE location information and on the client indicator; and, forwarding the text message to the client node enabling the client node to set up a communication to the UE.

In an example of an embodiment there is also provided a network node for enabling a client node of setting up a communication to a UE in a wireless communications network. The network node comprises a receiver circuit, a processor circuit and a transmitter circuit. The receiver circuit is configured to receive a text message originating from the UE and comprising UE location information and a client indicator. The processor circuit is configured to identify a client node based on the UE location information and on the client indicator. Additionally, the transmitter circuit is configured to forward the text message to the client node enabling the client node to set up a communication to the UE.

In yet an example of an embodiment there is provided a method in a UE for enabling a client node off setting up a communication to the UE in a wireless communications network. The method comprises: acquiring UE location information; including the acquired UE location information in a text message; transmitting the text message to a network node, the message including a client indicator; and, receiving a call back or a request for communication set up from a client node that is identified by the network node based on information in the transmitted text message.

In yet another example of an embodiment there is provided a UE for enabling a client node to set up a communication to the UE in a wireless communications network. The UE comprises a UE processor circuit, a UE transmitter circuit and a UE receiver circuit. The UE processor circuit is configured to acquire UE location information and to include the acquired UE location information and a client indicator in a text message. The UE transmitter circuit is configured to transmit the text message to a network node. Additionally, the UE receiver circuit is configured to receive a call back or a request for communication set up from a client node, identified by the network node based on information in the transmitted text message.

In yet an example of an embodiment there is provided a method in a client node for setting up a communication to a UE in a wireless communications network. The method comprises: receiving a text message originating from the UE; determining whether language consistency is required between the UE and the identified client node; and, setting up a communication to the UE based on UE location information comprised in the text message and on the determined language consistency result.

In yet an example of an embodiment there is provided a client node for setting up a communication to a UE in a wireless communications network. The client node comprises a client node receiver circuit, a client node processor circuit and a communication circuit. The client node receiver circuit is configured to receive a text message originating from the UE. The client node processor circuit is configured to determine whether language consistency is required between the UE and the identified client node. Additionally, the communication circuit is configured to set up a communication to the UE based on UE location information comprised in the text message and on the determined language consistency result.

An advantage achieved by at least some of the above mentioned embodiments is the enabling of new highly important type of emergency service over a wireless communications network where the service also includes emergency positioning.

Another advantage achieved by at least some of the above mentioned embodiments is the functionalities of acquire UE location information included in a text message and using this information for routing the text message to a client node (appropriate client node) that is more appropriate in setting up a communication with the UE.

Yet another advantage achieved by at least some of the above mentioned embodiments is the possibility of providing non-voice based sessions (emergency sessions) between a client node and a requesting UE. This non-voice based session is less affected by capacity overloads than voice based sessions.

Other objectives, advantages and novel features of aspects of the present disclosure will become apparent from the following detailed description of embodiments and aspects.

BRIEF DESCRIPTION OF THE DRAWINGS

The embodiments are described in more detail with reference to attached drawings illustrating exemplary embodiments and in which.

DETAILED DESCRIPTION

Figure 1:
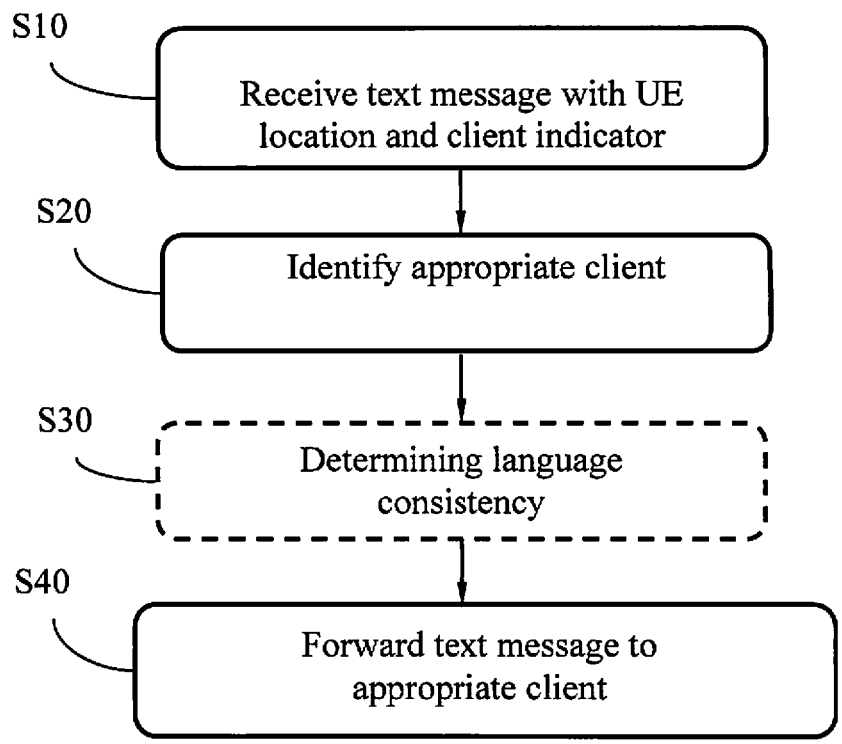
FIG. 1 is a flowchart depicting an example embodiment of a method in a network node.

The technology described in this application provides a non-voice based or non-voice initiated emergency service that allows users to contact emergency centres, e.g., users with speech disabilities or users in a threatening situation, without disclosing themselves by making noise associated with placing an emergency voice call. A network node may provide a location-aware non-voice based emergency service(s) using novel methodology, signalling, and architecture. This new type of emergency service may be provided over broadband-enabled networks and includes emergency positioning. This technology includes new signalling and functionalities in different nodes that relate to acquiring rough location information and using it for routing, transmitting a message to the appropriate client node (PSAP etc), with and without roaming, ensuring language consistency between the transmitted message and the client node, obtaining refined location information in connection to the non-voice based emergency session, and allowing for response and a call back for a non-voice initiated emergency service. Introducing new Client Types and Service Types to discriminate between different types of emergency services, e.g. emergency calls and non-voice emergency communication, is also proposed in this disclosure. Although the technology is mainly described for emergency services, it may also be adapted to commercial use or non-emergency applications in general.

The following description sets forth specific details, such as particular embodiments for purposes of explanation and not limitation. It will be appreciated by one skilled in the art that other embodiments may be employed apart from these specific details. In some instances, detailed descriptions of well known methods, interfaces, circuits, and devices are omitted so as not to obscure the description with unnecessary detail. Individual blocks are shown in the figures. Those skilled in the art will appreciate that the functions of those blocks and/or of described nodes/functionalities may be implemented using hardware circuit (e.g., analogue and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuit. Moreover, the technology may additionally be considered to be embodied entirely within any form of computer-readable memory, such as solid-state memory, magnetic disk, or optical disk containing an appropriate set of computer instructions that would cause a processor to carry out the techniques described herein.

Herein, the term "UE" is used as a general term for a wireless device which may or may not necessarily support CS-based and/or IP-based voice service and where the device may be a mobile, a laptop, a PDA, a user terminal, etc.

The term "SMS" is used as a general term to describe example embodiments for SMS and non-SMS text-based messaging services. The embodiments may also be used with any other messaging service, e.g. EMS, MMS, Instant Messaging (IM), any text-based messaging, where any of these can be real-time or non-real-time, session-based or session-less.

The embodiments are not limited to LTE, but may apply with any RAN, single- or multi-Radio Access Technology (RAT) networks and joint functionality nodes, such as MSC or gateways operable with more than one RAT. Some RAT examples are LTE-Advanced, UMTS, GSM, cdma2000, WiMAX, and WiFi.

Communication between two nodes herein implies either communication via a direct link, or a logical link (e.g. involving one or more intermediate nodes).

A positioning node, unless explicitly stated, may be understood as a positioning node or platform in the user plane, e.g., SLP in LTE, or a positioning node in the control plane e.g., E-SMLC in LTE, or a functionality within a network node.

Although many of the example embodiments are described for PSAPs, the technology also applies to commercial service nodes or client nodes. For example, corresponding embodiments may be obtained by replacing PSAP by a commercial service provider node, and removing "911" and "emergency" in the description. Due to the similarities with the emergency case described below, the general-case embodiments are not described in detail but can be easily understood by the skilled in the art.

FIG. 1 is an illustrating flowchart depicting an example embodiment of a method in a network node. The method is for enabling a client node of setting up a communication to a UE in a wireless communications network. The method comprises S10 a first step of receiving a text message comprising UE location information and a client indicator. The client indicator may e.g. be client type (e.g. emergency), and the indicator may or may not be sent in the same text message i.e. the client type may be received in a separate message. The text message may be received directly from the UE in case the network node is an intelligent radio base station comprising positioning functionality and routing functionality. The text message may also be routed via one or more network nodes such as an eNodeB node as in LTE or an RBS or a Radio Network Controller (RNC) as of WCDMA etc, before reaching the network node. The location information comprises one or more of the following: serving cell identity; cell identification for one or more other cells; network identification or network name; location information is a civic address; UE position information obtained by aid of a positioning method; and, radio signal measurements performed by the UE.

After receiving the text message the method then comprises a step of identifying S20 a client node based on the UE location information and on the client indicator. Other UE information may also be included in the text message and used for the identification and will be discussed further down in this disclosure. The client node may be identified by using a mapping procedure or a look-up table in order to identify the client node. The client node may be the one most appropriate in serving a UE in a certain geographical location i.e. based a geographical location principle.

The method may also comprise a step, which may be seen as optional in any of the embodiments, of determining S30 whether language consistency is required between the UE and the identified client node. The box is marked with dashed lines to mark that it is optional in combination with any other embodiment of the method. Then the client node may be identified based on a geographical location principle and/or on language capabilities of the identified client node. This means that a new more appropriate client may be identified when considering the language consistency criteria. In determining whether language consistency is required between the UE and the identified client node comprises determining whether language translation is needed, or not, and/or if the text message further comprises a language indicator indicating which language is used, to be used and/or preferred by the UE. According to one embodiment, a text recognition procedure, and when the determining reveals that a translation is needed, performing a translation to a language supported by the identified client node. The network node may comprise the translation functionality itself or request another translating network node to perform the translation. The translation may also be performed by the client node.

The method may also comprise determining whether the text message and/or additional received short status messages further comprising one or more of the following information: a session identifier; a UE identifier; a UE device identifier; a subscription identifier; an emergency identifier; a UE type identifier; UE capabilities information related to positioning; information relating to UE power consumption and/or current battery energy state for the UE; an end-user indicator or a set of end-user indicators indicating end-user communication and/or moving ability; a client type indicator; a service type indicator; and, at least one communication indicator indicating preferred means and way of communication or reply; and when so being the case, and using the one or more information for identifying the client node.

Following the description of FIG. 1, after identification of the client node i.e. the most appropriate client node for serving the UE, the method comprises a step of forwarding S40 the text message to the client node enabling the client node to set up a communication to the UE. Note that, the text message here may already have been translated to a language consistent with the language of the client node. The client node may then set up a call or text message based communication to the UE based on communication information that may be indicated in the text message.

Figure 2:
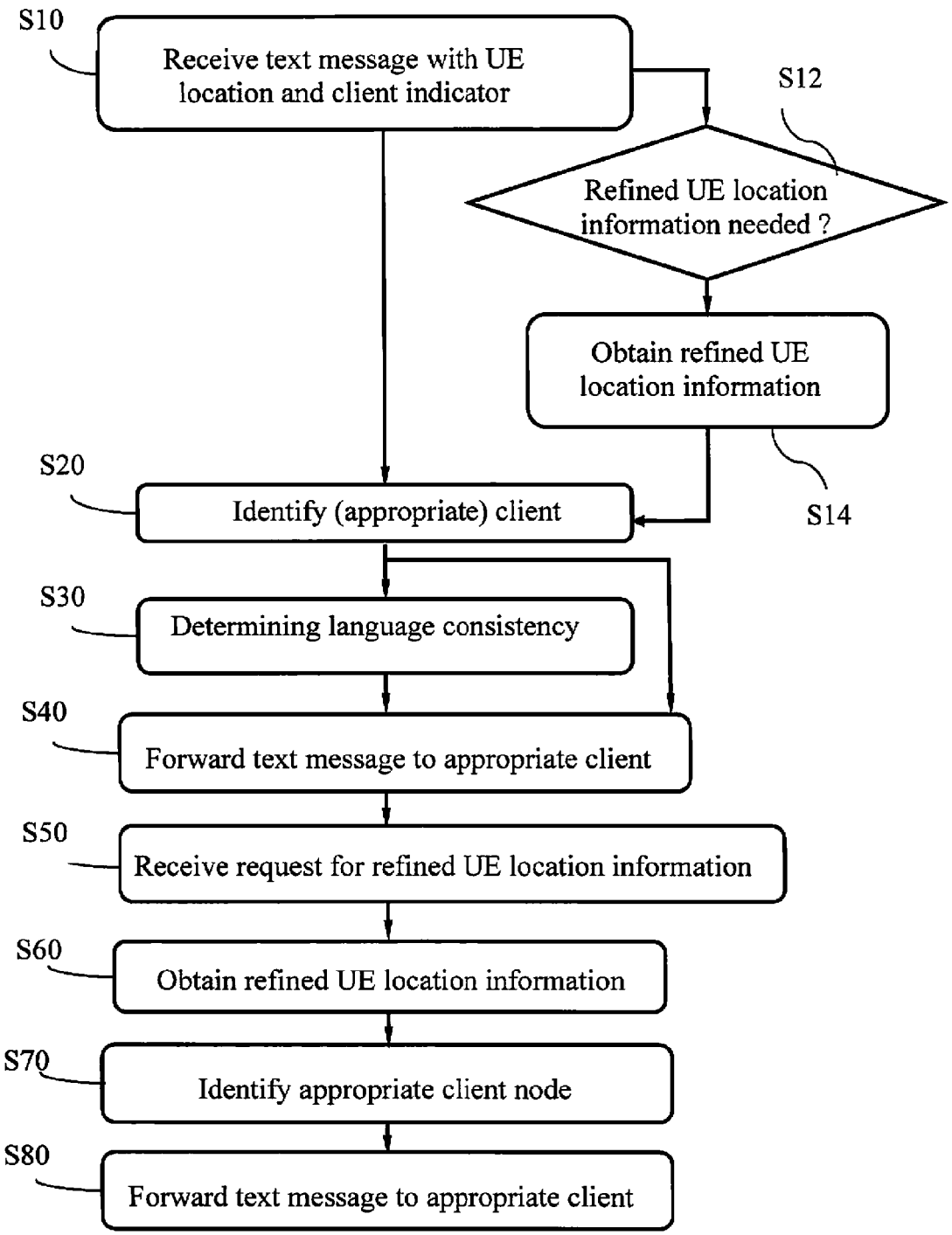
FIG. 2 is a flowchart depicting further examples of embodiments of the method in a network node.

FIG. 2 is an illustrating flowchart depicting further examples of embodiments of a method in the network node. According to one embodiment, the method may comprise a step of determining S12 whether refined/updated UE location information is needed; and when so being the case, obtaining S14 refined UE location information from the UE or from another network node. The obtaining S14 of refined UE location information may in this case relate to obtaining updated UE location information, since the UE location information is determined to be out of date. Thus, refined may also comprise updated information. By obtaining it is also meant retrieving or internally extracting already stored information etc. The refined UE location information is then for the identifying S20 of the client node or the appropriate client node. The refined UE location may be requested already before identifying the client node the first time or at any time to determine a more appropriate client node. Determining S12 whether refined UE location information is needed or not comprises determining whether the received text message comprises a time stamp and whether time elapsed from the time indicated by the time stamp is above a predefined time threshold. The time threshold may be a preset value or configurable by for example downloading it from another network node or server. The determining S12 may be based on whether the UE location information fulfils an accuracy requirement, or not.

According to an embodiment, the method in a network node may further comprise receiving S50 a request for refined UE location information, from the client node, or from another positioning network node or a central node. The method then comprises a step of obtaining S60 refined location information from the UE or from a positioning network node, or any other network node identified as capable of providing the refined UE location information. The obtained refilled UE location information is then forwarded S80 to the client node enabling the client node to use the refined UE location information when setting up, and/or when continuing, the communication with the UE.

According to an embodiment, the method in a network node may further comprise a first step of receiving S50 a request for refined UE location information, from the client node or from any other network node, and thereafter a second step of obtaining S60 the refined UE location information, as mentioned above. The method then comprises a third step of identifying S70 an appropriate client node based on the obtained refined UE location information. The identifying may be an identification of a new client node i.e. the appropriate client node, or the client node itself is still the most appropriate client node and therefore no new client node is selected/identified. The method then comprises a fourth step of forwarding S80 the text message to the "appropriate" (or most appropriate) client node enabling the "appropriate" client node to set up a communication to the UE. In case the appropriate client node is the client node then a communication may already be set up.

Note that, the language consistency criteria may be used in combination with any of the above mentioned embodiments and that the client node may be identified in all embodiments having language consistency as a basis.

Figure 3:
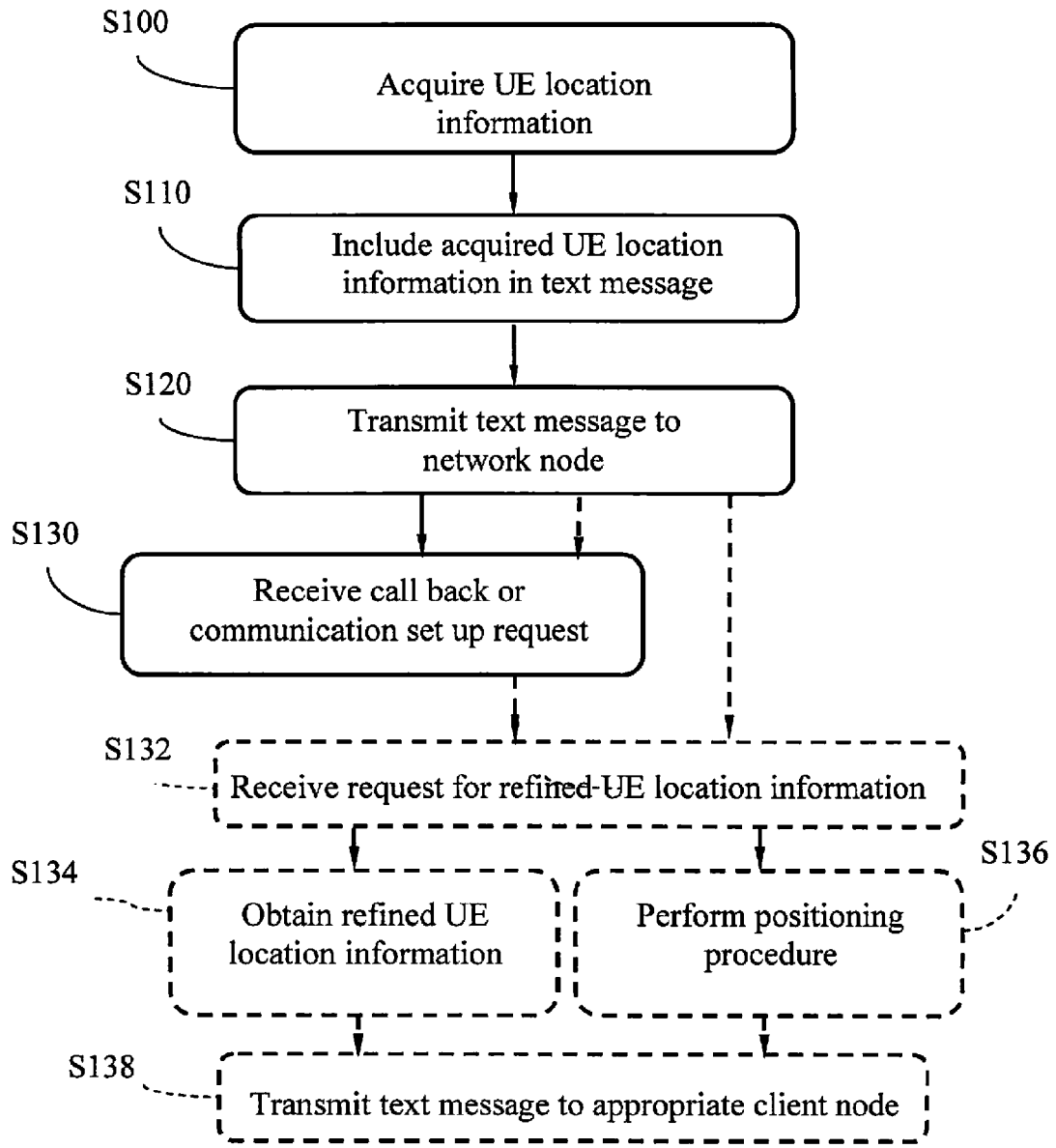
FIG. 3 is a flowchart depicting examples of embodiments of method(s) in user equipment.

FIG. 3 is a flowchart depicting examples of embodiments of method(s) in the UE. This is to reflect/cover the text message transmitting side. As seen from the figure a method in a UE is illustrated for enabling a client node to set up a communication to the UE in a wireless communications network. The method comprises a step of acquiring S100 UE location information, i.e. internally from a storage memory of from another network node with positioning functionality. The method then includes a step of including S110 the acquired UE location information in a text message and a step of transmitting S120 the text message to a network node, via one or more access/control network nodes. The message includes a client indicator, such as a home PSAP or a number. The method then comprises receiving S130 a call back or a request for communication set up from a client node identified by the network node based on information in the transmitted text message. The call back or request may be routed through one or more other network nodes or rout via the network node.

According to an embodiment the method may further comprise receiving S132 a request, from the client node, directly or via another network node, for refined UE location information. The UE then obtains S134 the UE refined location information from another network node such as a positioning node or a node comprising a positioning functionality, and, transmits S138 the obtained UE refined location information to the client node. Alternatively, the method in a UE may comprise a step of performing S136 a positioning procedure itself for determining the refined UE location information. The steps in this/these embodiment(s) are drawn with dashed lines in FIG. 3 and represent optional steps that may by implemented/executed in combination with any other embodiment of the method in a UE.

According to an embodiment, the method in a UE may comprise including S110 in the text message and/or the UE may include in additional short status messages to be sent in relation to the text message, one or more of the following information: a session identifier; a UE identifier; a UE device identifier; a subscription identifier; an emergency identifier; a UE type identifier; UE capabilities information related to positioning; information relating to UE power consumption and/or current battery energy state for the UE; an end-user indicator or a set of end-user indicators indicating end-user communication and/or moving ability; and, at least one communication indicator indicating preferred means and way of communication or reply.

According to an embodiment, the method in a UE may comprise including S110 in the text message and/or the UE may include in additional short status messages to be sent in relation to the text message a Client Type indicator and/or a Service Type Indicator.

Figure 4:
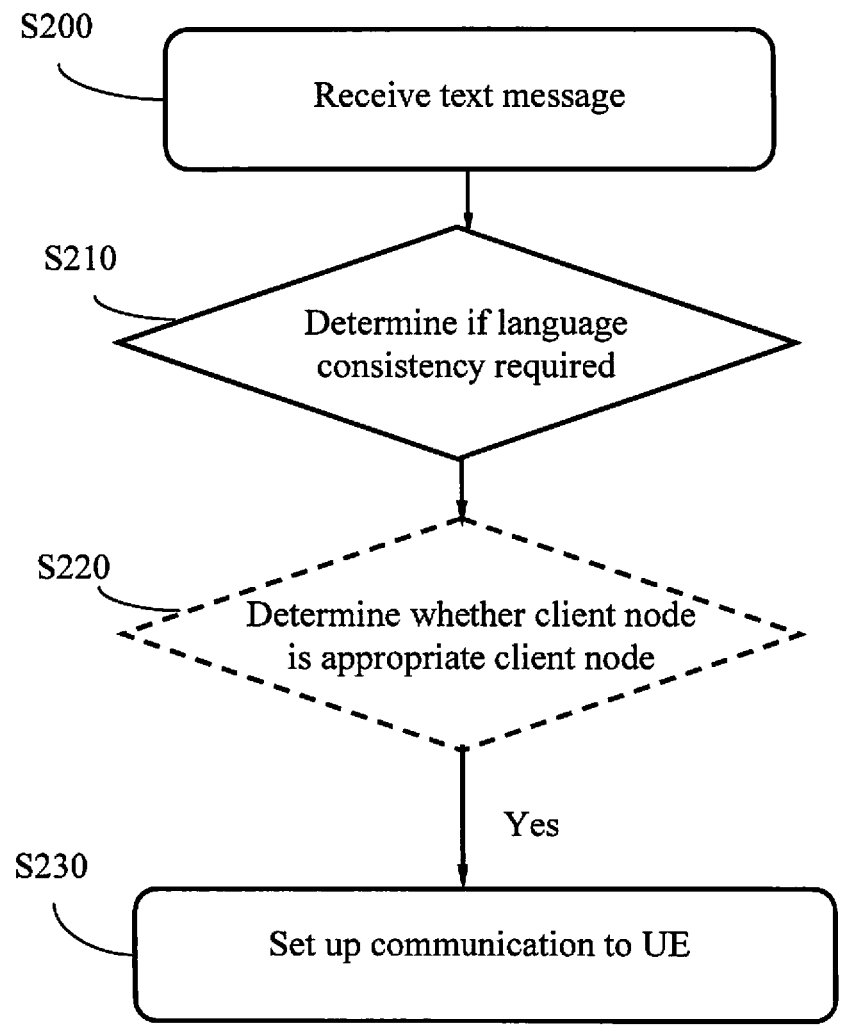
FIG. 4 is a flowchart depicting examples of embodiments of method(s) in client node.

FIG. 4 is a flowchart depicting examples of embodiments of method(s) in a client node such as a PSAP, LCS client or Emergency Centre (EC). According to this figure, the method comprises a step of receiving S200 a text message originating from the UE and a step of determining S210 whether language consistency is required between the UE and the identified client node. If so being the case, either performing a language translation procedure or requesting language translation to be provided from another network node. The determining S210 may be performed by a text recognition procedure or similar, as already mentioned in relation to FIG. 1. The method may comprise a step (optional and illustrated with dashed lines in FIG. 4) of determining S220 whether the client node is an appropriate client node for communicating with the UE, based on the UE location information and/or based on an identified communication language, and when so being the case proceeding with the next step. The method then comprises a step of setting up S230 a communication to the UE based on UE location information comprised in the text message and on the determined language consistency result. The method may also comprise a step of informing (not shown in FIG. 4) the network node that there is a more appropriate client node, based on a result from the determining S220, and that the network node should re-identify an appropriate client node. In an embodiment, the client node may itself comprise a mapping procedure or a look-up table for identifying the (or the more) appropriate client node.

According to an embodiment, the method mentioned above may also comprise a step of determining whether refined UE location information is needed, not shown in FIG. 4. When refined UE location information is determined to be needed, i.e. time based or accuracy requirements not fulfilled, the method then comprises obtaining refined UE location information from the UE or from the network node or any other defined network node with a positioning functionality. The obtained refined UE location information is then used for identifying whether the client node is an appropriate node, or not, i.e. if there is a more appropriate network node. The obtained refined UE location information may also be used for providing a most appropriate service to the UE, such as, shelter rooms, nearest hospital, gas station, or commercial information, e.g. related to friend finding etc. The set up communication may comprise calling up the UE or sending a response text message to the UE and may also be performed in a language consistent with the language used and/or indicated by the UE in the text message.

The client node may be a location Services (LCS) client, an emergency centre or a PSAP. The client node may also be used for voice-based Emergency service. In at least one embodiment, the client node used for non-voice based emergency service is different from the client node used for the voice-based emergency communication, and at least in one embodiment, both service types, e.g., voice-based and non-voice based emergency communication, are possible with the same client node. In at least one embodiment, a positioning client and SMS (in a general sense) client reside in the same client node.

Figure 5:
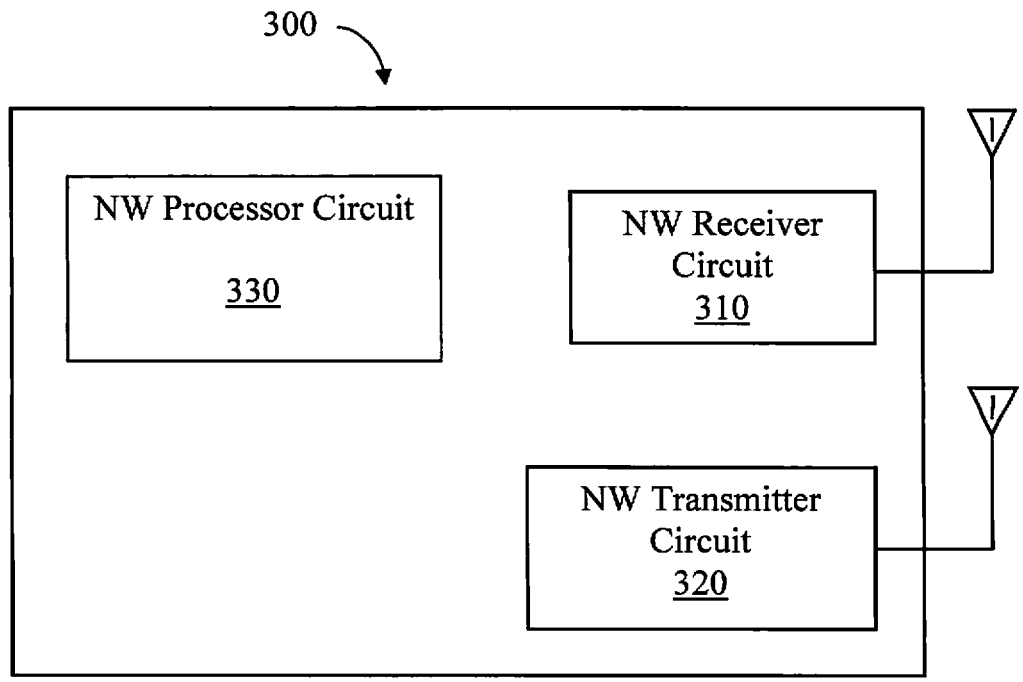
FIG. 5 is a schematic block diagram illustrating an example of embodiment of the network node.

FIG. 5 to FIG. 8, are all schematic block diagram illustrations of physical nodes that may include one or more of the method embodiments mentioned earlier. FIG. 5 is a schematic block diagram illustrating an example of embodiment of the network node. The network node (NW) 300 comprises a receiver circuit 310, a processor circuit 330 and a transmitter circuit 320.

The receiver circuit 310 is configured to receive a text message originating from the UE and comprising UE location information and a client indicator.

The processor circuit 330 is configured to identify a client node based on the UE location information and on the client indicator. The processor circuit 330 may further be configured to determine whether refined UE location information is needed, and when so being the case, obtain refined UE location information from the UE or from another network node, and, use the obtained refined UE location information for identifying an appropriate client node. The processor circuit 330 may also be configured to determine whether refined UE location information is needed, and when so being the case, obtain refined UE location information from the UE or from another network node, and, use the obtained refined UE location information for identifying an appropriate client node.

Determining whether refined UE location information is needed may be done by, determining whether the received text message comprises a time stamp and whether time elapsed from the time indicated by the time stamp is above a predefined time threshold. In an embodiment, the processor circuit 330 may determine whether the location information received in the text message fulfils an accuracy requirement, or not.

In one embodiment, the processor circuit 330 may be configured to determine whether refined UE location information is needed, and when so being the case, obtain refined UE location information from the UE or from another network node, and, use the obtained refined UE location information for identifying an appropriate client node.

Continuing with the description of FIG. 5, the transmitter circuit 320 is configured to forward the text message to the client node enabling the client node to set up a communication to the UE.

Figure 6:
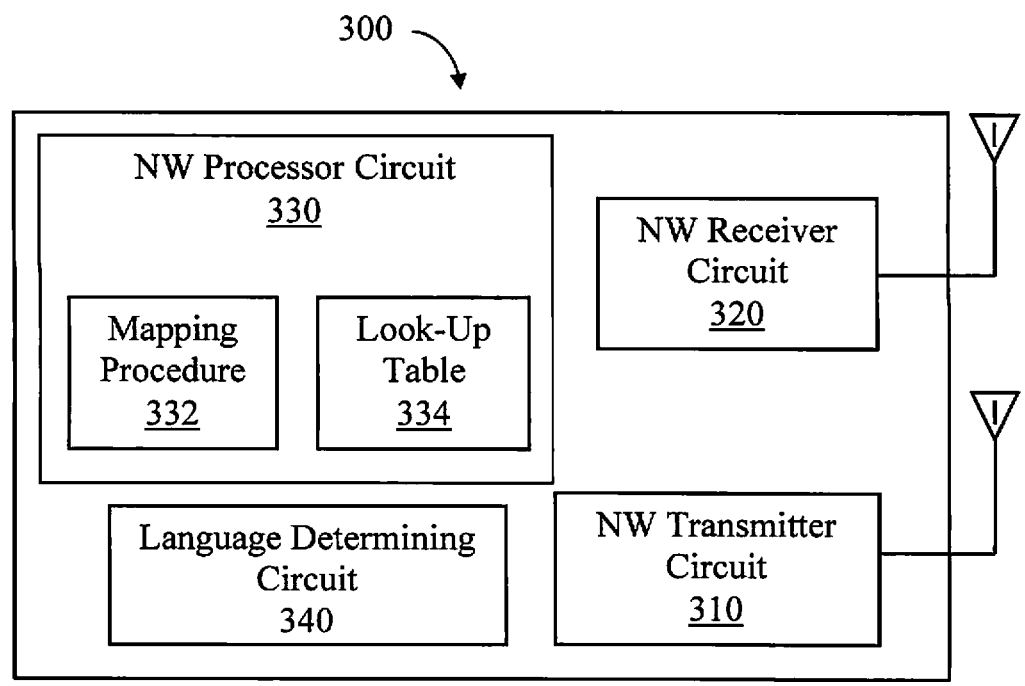
FIG. 6 is a schematic block diagram illustrating further example of an embodiments of the network node.
Figure 7:
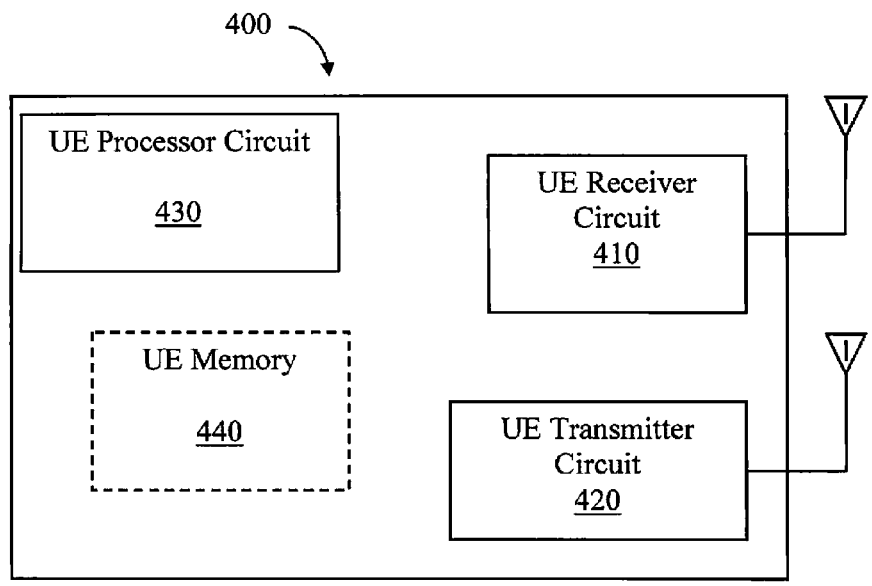
FIG. 7 is a schematic block diagram illustrating an example of embodiment of user equipment.

According to an embodiment, the network node 300 may comprise a language determining circuit 340 configured to determine whether language consistency is required between the UE and the client node. Language consistency may be determined for example by aid of a text recognition procedure or by reading a language indicator in the received text message. This is illustrated by FIG. 6, which also illustrates other embodiments of the network node 300. According to FIG. 6, the processor circuit 330 may further comprise a mapping procedure 332 and/or a look-up table 334 for use in order to identify the client node. FIG. 7 is a schematic block diagram illustrating an example of embodiment of a UE. The UE 400 comprises a UE processor circuit 430, a UE transmitter circuit 420 and a receiver circuit 410. The UE processor circuit 430 is configured to acquire UE location information and to include the acquired UE location information and a client indicator in a text message. The UE processor circuit 430 may further be configured to obtain UE refined location information from another network node, or by performing a positioning procedure for determining the refined UE location information itself (internally obtainable). The UE processor circuit 430 may further be configured to include in the text message and/or in additional short status messages to be sent in relation to the text message, one or more of the following information: a session identifier; a UE identifier; a UE device identifier; a subscription identifier; an emergency identifier; a UE type identifier; UE capabilities information related to positioning; information relating to UE power consumption and/or current battery energy state for the UE; an end-user indicator or a set of end-user indicators indicating end-user communication and/or moving ability; and, at least one communication indicator indicating preferred means and way of communication or reply.

Continuing with the description of FIG. 7, the UE transmitter circuit 420 is configured to transmit the text message to a network node. The UE transmitter circuit 420 may also be configured to transmit obtained UE refined location information to the client node.

Referring back to FIG. 7, the UE receiver circuit 410 is configured to receive a call back or a request for communication set up from a client node, identified by the network node based on information in the transmitted text message. The UE receiver circuit 410 may be configured to receive a request(s), from the client node, for refined UE location information.

Figure 8:
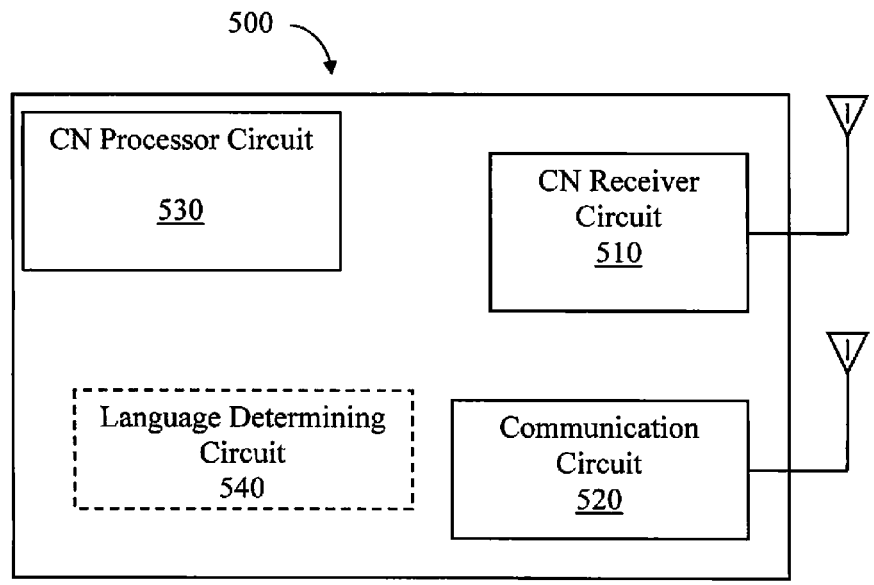
FIG. 8 is a schematic block diagram illustrating an example of embodiment of a client node.

An example of the client node is illustrated by FIG. 8. According to FIG. 8, the client node 500 comprises a client node receiver circuit 510, a client node processor circuit 530 and a communication circuit 520.

The client node receiver circuit 510 is configured to receive a text message originating from the UE.

The client node processor circuit 530 is configured to determine whether language consistency is required between the UE and the identified client node. The client node processor circuit 530 may be further configured to determine whether the client node is an appropriate client node for communicating with the UE, based on the UE location information and/or based on an identified communication language. The client node processor circuit 530 may also be configured to determine whether refined UE location information is needed, and when so being the case, obtain refined UE location information from the UE or from a network node; and use the obtained refined UE location information for identifying whether the client node is an appropriate node, or not.

Referring back to FIG. 8, the communication circuit 520 is configured to set up a communication to the UE. The communication may be based on many criteria. According to an embodiment the communication is based on UE location information comprised in the text message and on the determined language consistency result. Refined UE location information is another criterion on which the communication may be based.

Some illustrating examples of implementation and/or embodiments will now be disclosed. Although many of the following examples of embodiments are described for PSAPs, the technology also applies to commercial service nodes or clients. Due to the similarities with emergency cases described hereafter, the general-case embodiments are not described in detail but may be understood by a person skilled in the art.

According to an example of embodiments, the text message is an emergency message, also SMS in a general sense, which comprises a message that contains at least one of: text, graphics, video, multimedia, etc., related to the emergency situation. The emergency message contents may be pre-configured or may follow a pre-defined template. The emergency message may also comprise one or more of the following:

Session ID i.e. for the session-based emergency messaging,

UE identification (e.g. SIM card identification or information related to user profile), Device identification (e.g. device type, device ID or wireless card ID), Subscription identification, e.g. in the form of a SIM card identification, Emergency indicator e.g., a binary indicating an emergency when set to 1 or the emergency number, UE type e.g., mobile, laptop or PDA, and their series, which may be used e.g. for the remaining energy estimation, Location information, UE capabilities related to positioning e.g., supported methods, supported frequencies, etc., Information related to power consumption and/or the current battery energy level e.g., remaining battery level as a pre-defined indicator (critical/low/medium/high) or in percent to the maximum level or in remaining time, A language indicator related to preferred or used message language, An indicator or a set of indicators related to the end user communication and/or moving ability are included in emergency message, e.g. limited (or no) writing/limited (or no) speaking/limited (or no) moving, where the ability may also relate to the ability in the current situation or user preferences, At least one indicator related to preferred means and way of communication or reply, e.g. same/SMS, or other messaging such as voice contact, where the "same" implies that a response from PSAP shall be in the form of SMS if the communication to PSAP has been in the form of SMS.

In an example embodiment, additional short status messages are sent during the emergency session, e.g. indicating the battery level. This may be done for example every time a certain battery threshold is reached. Examples of battery thresholds are every decrease by 50%: 25%, 20%, 15%, 10%, etc.

Thus an emergency communication set up may include the following steps of acquiring location information, identifying an "appropriate" PSAP, transmitting the emergency message to the appropriate PSAP (with and/or without roaming, i.e. with or without changing the network), ensuring language consistency between the transmitted emergency message and the identified appropriate PSAP, obtaining refined or further location information and performing a call back or SMS back to UE.

The steps listed above are not necessarily executed in the same order as described. Nor are all of the steps necessarily always required. It is also understood that although the steps above only describe a single two-way message exchange (excluding e.g. acknowledging), there may be multiple message exchanges between the UE and the PSAP as well as there may be several fragmented messages or a sequences of messages transmitted in at least one of the directions, and the fragments and multiple messages in the same direction e.g., from UE, are directed to the same PSAP and may also go via the same path in at least some cases.

Procedures for Acquiring/Obtaining Location Information.

Following are examples given on how location information is acquired/obtained wherein the acquiring of location information is done at a transmitting side.

In known text message (SMS) procedures and definitions, no location information may be included in txt message signaling. However, to make sure that the message is delivered to an appropriate/preferred PSAP, at least "rough" location information may be acquired before transmitting the message, where the "rough" location information may comprise either positioning information already available in the UE or the location information that may be quickly obtained. This "rough" location information is e.g., location information that meets a certain age requirement to make sure that this location information is not outdated and not timed out. This may be achieved by for example using time stamps. Rough location information, hereafter denoted only location information, may not be quickly available due to a fact that the available information is old, i.e. the age or time passed is above a threshold. The location information availability depends on UE capability and UE implementation, and even though it may be sufficient with this location information at this step, high precision position i.e. refined location information, if available, may be included in the text message.

The location information may comprise one or more of the following:

Serving cell identity,

Cell identification for one or more other cells,

Network identification or network name,

Location information in a civic address format, where the location information is not necessarily a position of the UE but may also describe location of a nearby object or a radio node location, and where the location information is either received from another node, e.g., eNodeB, MME, positioning node, femto gateway, etc., or acquired from a local database as a result of a UE-based positioning method, Device position information, e.g. a set of (latitude, longitude) or (latitude, longitude, altitude, horizontal uncertainty, vertical uncertainty, confidence level, speed, direction), where the location information is obtained by a positioning method (e.g., GPS, A-GPS, GNSS, A-GSNN, OTDOA, UTDOA, AEICID, E-CID, CID), either received from the network or obtained by the UE as a result of a UE-based positioning procedure, and may be included in SMS as text, graphics, e.g. vector graphics, binary data, or a separate container with the location information received from another node e.g. the positioning result delivered with LPP positioning report. The device position information may follow a position reporting format corresponding to one of the 3GPP GAD shapes.

Radio signal measurements, e.g. received signal strength or received signal quality of one, e.g., the serving cell, or more cells, associated with the cell identities (the measurements may be transmitted when e.g. no position information is available).

The acquired location information used for emergency communication or any other communication may be stored in a UE memory 440.

In one example embodiment, the acquired location information is included in the SMS to be transmitted to an indicated PSAP, either as a part of the (e.g. multi-object) text message (SMS) or in SMS signaling. In another embodiment, redundant location information, i.e. the location information that has not been updated since the last transmission of the location information within the same session, is not signaled and not included in the next text message, at least for session-based emergency service, but possibly also for session-less service e.g. when the messages follow a same path or a same destination is guaranteed. In one embodiment, this applies to the next text message transmitted to the same emergency number within the same emergency session for the session-based emergency service.

In this example embodiment, the location information included in the text message (SMS) or signaled in association with or in relation to the text message (SMS) is tagged with at least one of time/date information, serving cell ID and tracking area ID. The tagging may either be at the transmitting side (UE) or may also be added in the first radio network node (RBS) or first MME. In one example embodiment, the location information (i.e. positioning result) included in the SMS is later validated by a network node against the most recent serving cell ID and tracking area ID, accounting for the time/ date information. The serving cell ID tag or the tracking area ID may also be used for identifying/defining the destination PSAP in a relevant node i.e. the most appropriate client node.

In this example embodiment, the transmitted text message (SMS) is added/stamped with the location information at a network node 300 when the text message contains an indicator for example for emergency. In one example implementation, the location information is either in a civic address format, e.g. as described in, or it is serving cell ID information. In another example, the network node 300 is an eNodeB or MSC or a gateway node (e.g., femto gateway) or a routing node or MME and may include positioning node functionality.

Transmitting of Text Message to "Appropriate" Client Nodes.

Following are examples given on how the text message is transmitted to the client node 500, which in most cases is the most appropriate client node.

In one embodiment, the client node 500, i.e. the appropriate client node or appropriate PSAP, may be a local, preferably the closest, PSAP, i.e., the PSAP selection is based on the geographical principle. In contrast, the UE may only be aware of at most a PSAP and is thus routed to the home PSAP by indicating the home PSAP in the text message. The home PSAP may be irrelevant for providing a service, especially when the UE is in roaming, e.g. in another network and remote geographical area. Therefore, in this example embodiment, the location information is used for routing the message to the appropriate PSAP, which is not necessarily the home PSAP, but could be the home PSAP. In one specific example, the location information in a civic format or the cell identification is used for routing.

Further, PSAP selection may be implemented as a mapping function in a network node 300 or in the client node 500 (PSPA), where the mapping function maps all or some of the information obtained from the text message to a PSAP and where the information may comprise one or any combination of message type (e.g. SMS or MMS), preferred means of communication, location information, language indicator, home PSAP indicator and end-user ability etc. PSAP capabilities and current status, e.g. PSAP load situation, may also be accounted in such mapping.

In one example embodiment, the mapping is implemented in a serving MSC or MME or CSCF node or an IP gateway network node or SC, or a center node handling the messaging service in general, not limited to the known SC. Thus, the mapping may be implemented as a distributed functionality.

In another example embodiment, the mapping is performed during establishing of a session for the emergency text message service. In yet another embodiment, the mapping is performed for each separate text message (SMS), in case no session-based communication may be established.

Once the mapping is known, the text messages, as well as the location information associated with this session, must be routed to same PSAP. One way of enabling this is to include a PSAP identification/indicator in all text messages, including the response messages, associated with the same user ID and/or session ID. The mapping result (i.e., the PSAP identification) may also be signaled back to the origin of the first text message or to the origin of the session initiation message, e.g., together with the text message or session acknowledgement or text message reception acknowledgement. The mapped PSAP may then be stored in the mapping node, e.g. together with the user ID, and/or in the UE. The latter would allow the UE to include the mapped PSAP as the destination in its outgoing messages sent to the emergency number.

PSAP in this section, selection based on a geographical principle has been described earlier. In a more sophisticated approach, a set of PSAPs may be used, where the PSAPs may or may not be connected to a gateway or routing node, see e.g. FIG. 9a-c, even in the same area but with PSAPs being differentiated by some criteria. An example of the criteria may be the language, where text messages indicating a language from a certain group, e.g., configured in advance, are directed to one PSAP node and messages indicating a language from another group are directed to another PSAP node and where the indicating may be a coded language indicator related to the message language and where the indicator may also indicate the preferred language of response message(s). PSAPs may also be differentiated by their capability, e.g. the ability to deal with text messaging, voice only, multimedia, or a mix. In one embodiment, a PSAP may itself be a gateway or a router to direct the received calls and message to appropriate interfaces. Note that, although the term PSAP is used in this illustrating section the client node may be any other type of client node and is not limited to a PSAP.

Figure 9A:
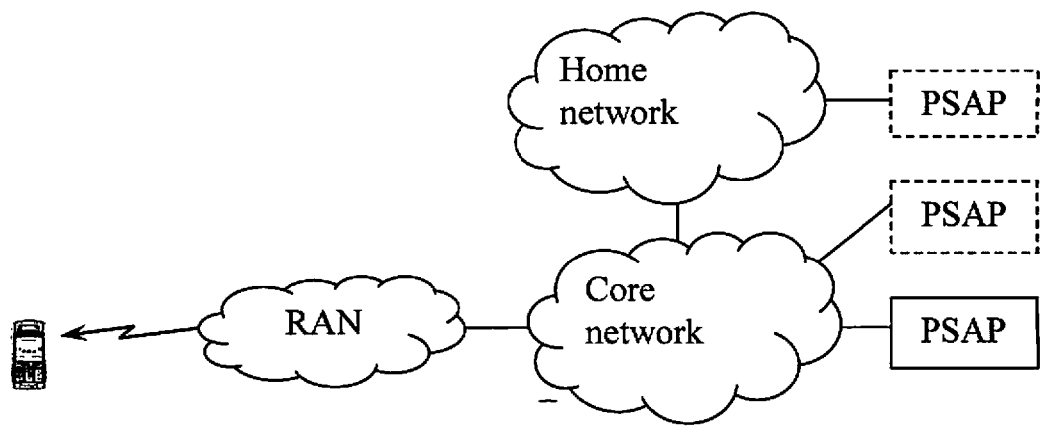
FIG. 9a is a schematic block diagram illustrating an example of an implementation in a wireless communications network.

FIG. 9a illustrates an example of an embodiment of a PSAP (solid line) and wherein roaming selection is done in the network, e.g., by the network node or a routing node. According to this illustration a text message received from a UE passes the Radio Access Network (RAN) and is routed to the appropriate PSAP already at the core network by aid of the network node 300.

Figure 9B:
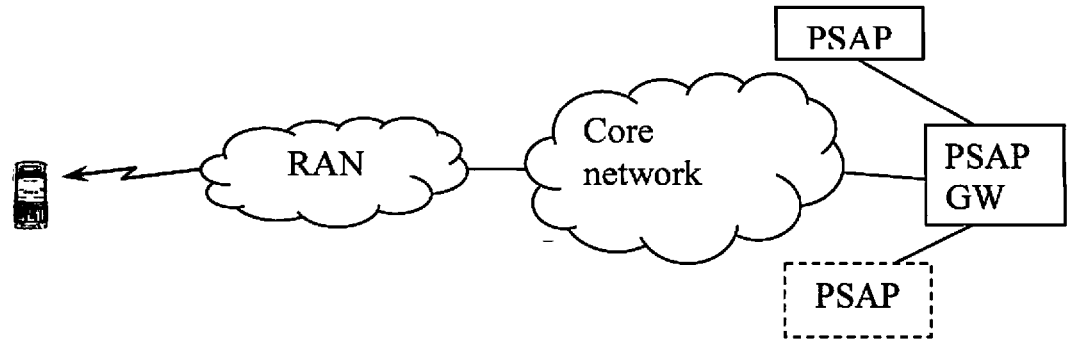
FIG. 9b is a schematic block diagram illustrating another example of an implementation in a wireless communications network.

FIG. 9b illustrates an example of an embodiment of a preferred PSAP (solid line) and wherein PSAP selection is done by a PSAP Gateway (GW), e.g., by the network node 300 including PSAP GW functionality or by the client node 500 including PSAP GW functionality. According to this illustration a text message received from a UE passes the Radio Access Network (RAN) and the core network and is routed to the appropriate PSAP at the PSAP GW.

Figure 9C:
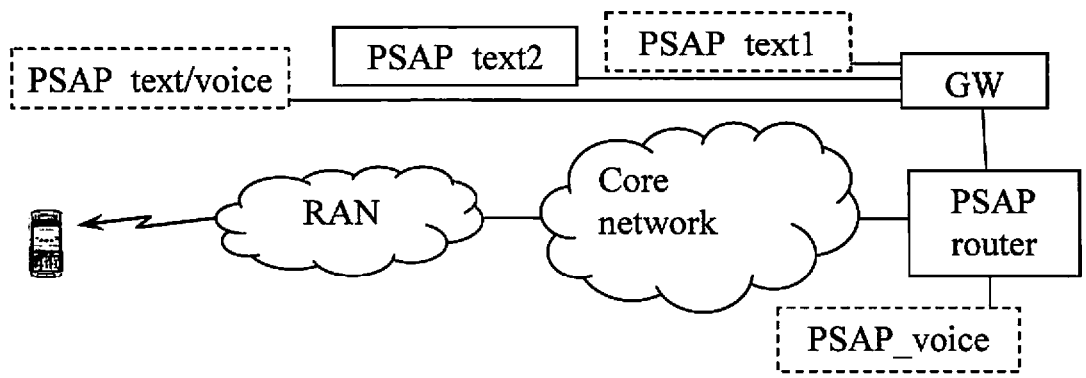
FIG. 9c is a schematic block diagram illustrating yet another example of an implementation in a wireless communications network.

FIG. 9c illustrates an example of an embodiment of a preferred PSAP (solid line) and wherein PSAP selection is done by a GW and voice-only communications/connections are or to a separate PSAP via PSAP-router. Note that, the network node 300 may include the GW functionality and/or the PSAP-router functionality, so does also the client node 500. According to this illustration a text message received from a UE passes the Radio Access Network (RAN) and the core network and is routed to the appropriate PSAP depending upon communication request/possibilities.

Upon successful text message delivery to PSAP, the PSAP may acknowledge the received text message or a fact of that it has been read by a PSAP agent/client. An acknowledgement may also be sent by the UE upon receiving/reading the PSAP text message.

Following, a PSAP mapping approach is described in more detail based on serving cell ID location information. A lookup/mapping table is maintained in each text message service centre (SMS SC) (in its general sense) for matching serving cell ID to a designated PSAP and the lookup table is dynamically updated based, e.g., on optimal routing and load information. Matching is used when a text message is sent or to be sent to a symbolic number, e.g. "911" or "112" or contains an emergency indicator. Based on the lookup table, the serving cell ID is translated to an address of a local PSAP. A same path including destination shall be maintained for multiple short message transfer, retransmissions and ACK messages, as long as the UE is connected to or communicates to the same SC and PSAP. In one embodiment, the same destination is maintained within the same session within multiple sessions within a given time interval, e.g., one day.

Language Consistency Examples.

Language-specific contents may be used in order to determine language consistency, such as: the text body in the text message from the UE to PSAP; the text body in the text message from PSAP to the UE; a location information signaled or included in the text message; and/or a location information stamped in another node for the text message, when it can be recognized as an emergency message.

At least the UE 400 and the PSAP 500 are involved, but another network node 300 may also be involved that may stamp text messages (emergency messages) with the location information. Language consistency needs to be ensured among all involved nodes. To make this possible, a language indicator in the text message or associated signaling may be used to align the request-response languages, e.g., the PSAP response by default is in the language indicated in the received text message. This may be done in at least two ways. In one, the PSAP provides the response message in the requested language. In another, the PSAP provides the response message in a language supported by the PSAP, and the message is translated in one of the translating nodes, e.g., a PSAP outgoing interface or at the network node 300, where the translating node needs to know the language of the text message and a desired language. If two such language indicators are used, then the translating node with translation capability may first check whether translation is necessary (by comparing the two indicators) and then whether the desired language is supported by the translating node, or the other way around first check the supported language and then whether translation is necessary. If a need and possibility for the translation is identified, old text is replaced by translated text and passed to the next node on the path. Otherwise, the message is passed unchanged. In one embodiment, the path is selected to ensure that a message that needs translation passes at least one network node with translation capability. In another embodiment, a load of translating nodes is taken into account when selecting the path.

The language may also be "negotiated" or communicated between PSAP and UE during session setup, i.e. for session-based emergency service. If there is a language conflict, PSAP remapping may be considered, e.g. by the PSAP requesting the network node 300 to repeat procedure or by PSAP identifying another appropriate PSAP. Alternatively, the PSAP is selected such that language conflict is avoided.

Refined Location Information Procedures and Information.

In an example embodiment, when received location information does not meet certain requirements, e.g., time requirements such as for example, time elapsed from a time indicated by a time stamp to the current time exceeding a certain threshold. Other requirements that may need to be fulfilled are for example accuracy requirements e.g. an uncertainty of the available location information exceeds a certain threshold or the associated confidence level is below a certain threshold. When these requirements are not fulfilled then a positioning session is to be triggered for obtaining/acquiring/retrieving refined location information. This could be performed based on an aperiodic or periodic position reporting procedure.

In another example embodiment, periodical positioning result reporting i.e. refined location information reporting, is configured in UE, network node or PSAP, and the periodicity is based on at least one of: the UE speed and UE power consumption/battery energy information. Refined UE location information may also be provided already upon the text message is sent, i.e. as the location information. The UE 400 may be configured to always report UE speed or upon request. In yet another embodiment, the reporting periodicity may be updated based on the reported UE speed while taking into account battery energy level/capacity, e.g., frequent periodic reporting is preferably avoided for UEs with a critically low battery level.

In one embodiment, the request for refined UE location information is transmitted, e.g., by PSAP or the network node, may comprise pre-defined set of parameters being emergency Client Type, Service Type, requested positioning QoS and where a preferred positioning method or a set of positioning methods may also be indicated etc. The indicated preferred set of positioning methods may be related to the UE capability and/or power consumption/battery energy, e.g., GPS or GNSS based positioning may be less preferred when the battery level is at a critically low level whilst network-based positioning may be more preferable. The UE power consumption/battery energy related information may also be included in refined UE location information or signaled as a UE capability within the positioning session.

In another embodiment, if UE measurements are provided together with an SMS, the UE measurements are further sent to a positioning node, e.g. by PSAP or MSC. The obtained positioning result is delivered to PSAP or network node as refined UE location information and processed further. This refined UE location information may also be included in the response message. If the location information is in a civic address format, the language consistency needs to be ensured with the message contents. This is simply because addresses may be entered using a certain language and translation may hence be needed.

Emergency Support in the CONNECTED and IDLE States.

With session-less emergency text messaging, it is not guaranteed that the UE 400 is in the CONNECTED state when a positioning session is initiated acquiring refined UE location information. If the UE goes to the IDLE mode after contacting the PSAP or emergency centre, measurement logging in the IDLE mode may be triggered. The set of measurements may be later used for positioning. The set of measurements and the logging configuration may be pre-defined for the emergency service in question, e.g. RSRP of N best cells. In another embodiment, UE power consumption and/or battery energy are taken into account in the measurement and logging configuration in the IDLE state, when the measurements are intended to support the emergency service.

In another embodiment, the UE stays in the CONNECTED state after contacting a PSAP or emergency centre for a period specified in association with the emergency service. The network cannot then initiate the connection release procedure to the UE in the CONNECTED state until the timer associated with the specified period expires.

In another embodiment, upon receiving for example an SMS by PSAP and determining that the UE is not in the CONNECTED mode, the UE is paged. Determining that the UE is not in the CONNECTED mode may be done by PSAP, e.g. by getting a positioning request failure or the information from a network node tracking a state of the UE, e.g. RNC in WCDMA or eNodeB in LTE or MME in LTE. Paging is starting from a most recently used, by the UE, RAN in a multi-RAT system or LTE by default, e.g. if no information is available in the network about the previously used RAN, thus enabling the multi-RAT emergency service. If positioning is optional for an emergency message, then when it is necessary, i.e. identified that the UE is not in the CONNECTED state, the PSAP receiving the SMS message shall trigger the UE paging, i.e. by signaling or sending a message to the responsible network node (e.g., MSC or MME or IP routing node or a gateway or SM) prior starting a positioning session. Otherwise, paging may be triggered automatically when a response message sent to the UE from the PSAP reaches the responsible node.

Call Back Procedures, Communication Set Up.

In this embodiment, the indicator, i.e. indicator related to the preferred means and way of communication or reply, may be used to decide on a way the PSAP shall contact the UE. Furthermore, the language indicator may also be taken into account here. When there is an established session, then the PSAP may choose/negotiate any means to contact back the UE. The PSAP may call back to the UE, even in case no session has been established. However, the preferred communication way indicated by the UE is essential here. The call shall be set up to not cause any ringing/vibrating when this is not acceptable for the UE. The PSAP is in charge to request such a call session, e.g. by sending a request to another network node, e.g. MSC or MME. Once the UE is on a traffic channel, the PSAP should then be able to do MT-LR with emergency Client type.

Barring ringing, or any specific alert configuration, may be implemented in different ways.

Example 1

'E-911 ring barring' information element (e.g., with binary values corresponding to 'on' or 'off') is defined in a network communication protocol between PSAP and a network node, where the information obtained from the IE is used by the network to ensure barring ringing in the UE. The UE is informed by higher-layer signaling from a network node or a radio network node (e.g., eNodeB) and configures ringing for the callback accordingly, where the network node receives the information either from another network node or from PSAP.

Example 2

An indicator is included in the text message transmitted to the UE, where the inclusion may be e.g. by adding a pre-defined tag in the text message header which defines incoming alert for the message.

Example 3

PSAP sends the Client Type and/or Service Type information corresponding to the emergency service type in question, which further determines UE configuration, where client type or service type information is communicated to the UE via one more network nodes. Alternatively, to explicitly signal the indicator, a pre-defined radio bearer configuration, which includes barred ringing, may be associated with the Client Type and/or Service Type. A Client Type indicator and/or Service Type indicator may be used here.

Example 4

An incoming connection alert in the UE may be configured by means of a Session Initiation Protocol (SIP) or other similar-functionality protocol. SIP is an IETF-defined signaling protocol used for controlling multimedia communication sessions such as voice and video calls over Internet Protocol (IP). Extending the format of SIP messages to enable for configuring at least one silent emergency mode is thus an example of a further embodiment.

In a network node or by PSAP the ring barring indicator may be decided based on at least one of: UE preferences/capabilities e.g. as described above, Client Type (e.g., a configured Client Type or a new pre-defined Client Type may be associated with non-voice based emergency services), or Service Type (e.g., a configured Service Type or a new pre-defined Service Type may be associated with non-voice based emergency services).

Vibration, screen light, message notification, any type of alert, etc. may be configured in a way similar to the described above procedures for ringing. A set of configuration may also be collected in a pre-defined configuration profile, which may either be stored locally in the UE or received from the network. The profile may be associated with the emergency service type. The profile may also be configured in the UE via user interface by changing default settings.

Another aspect of the technology relates to UEs, wherein a UE maintains at least one profile, locally stored or received from the network, configured for at least one emergency incoming connection. The connection is associated with receiving a message, a call, multimedia, etc. originated from PSAP. The incoming alerts are configured to be in a silent emergency mode e.g., no ringing, minimum sound or light alerts, etc. The profile is configured and used for a specific emergency service type, connection type, and/or is in accordance with UE preferences/capabilities as describes earlier. The specific emergency service type may, e.g., be a non-voice based emergency service or non-voice initiated (initiated from the UE) emergency service.

The example embodiments in following sections, like in other sections, are not limited to LTE only, and apply both to user and control planes. A problem with existing approaches is that there is only one Client Type for emergency services, which may be not enough when different emergency service types are deployed in the network, e.g., emergency calls and text-based emergency service. Therefore, in one example embodiment, the set of known Client Types is extended by at least one new Client Type to account for the new type of emergency services. In another example embodiment, separate Client Types are used for voice-only, text-based and mixed emergency services. There may also be a separate Client Type for multimedia messaging emergency service. In another embodiment, known emergency service types are extended to account for the new type of emergency service, e.g., a new Service Type is defined for text-based, multimedia messaging or mixed emergency services.

At least one of the new Client Types and or Service Types may be signaled (e.g., as a new encoded value of the LCS Client Type or LCS Service Type information elements) along any existing or disclosed herein interface and between the relevant network nodes (directly or via one or more other nodes), e.g. between: MME and positioning node (E-SMLC in the control plane or SLP in the user plane), E-SMLC and SLP, Positioning node and LMU (Location Measurement Unit, used for UTDOA), LCS Client and MME/MSC/GMLC, GMLC and MME/MSC. The protocols for the above-described interfaces are enhanced with the described new signaling, e.g. LCS Application Protocol (LCS-AP) used between MME and E-SMLC, Radio Access Network Application Part (RANAP) over Iu interface in UTRAN.

New signaled Client Type and/or Service Type information may be used by received node, e.g. positioning node, PSAP or by the network node, for discriminating e.g. between voice and non-voice emergency services and potentially different prioritization, positioning method selection, etc.

Further, it is to be noted that some of the described circuits 310-340, 410-440, 510-540 comprised within the network node 300, the UE 40 and the client node 500, respectively, are to be regarded as separate logical entities but not with necessity separate physical entities. To mention just one example, the processor circuit 330 of the network node 300, and the language determining circuit 340 may be comprised or co-arranged within a same physical circuit.

The method in the network node 300 may further be implemented through one or more circuits 310-340, together with computer program code for performing the functions of the method. Thus a computer program product, comprising instructions for performing the method in a network node may assist, when the computer program product is loaded into or run in the network node 300. The same conclusions may be drawn up for the UE 400 and the client node 500.

The computer program product mentioned above may be provided for instance in the form of a data carrier carrying computer program code for performing the method in a network node 300, the method in a UE 400 or the method in a client node 500, when being loaded or run on the network node 300, the UE 400 or on the client node 500. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloadable to the network node 100 remotely, e.g. over an Internet or an intranet connection.

The invention claimed is:

1. A network node for enabling a client node to set up a communication to a User Equipment (UE) in a wireless communications network, the network node comprising:
   a receiver circuit configured to receive a text message originating from the UE and comprising UE geographic location information and a client type indicator;
   a processor circuit configured to identify the client node based on the UE geographic location information and on the client type indicator, wherein the client node is of a type indicated by the client type indicator, and the client node serves an area in which the UE is located; and
   a transmitter circuit configured to forward the text message to the client node enabling the client node to set up the communication to the UE;
   wherein the processor circuit is further configured to:
   determine whether refined UE location information is needed, and when refined UE location information is needed:
      obtain refined UE location information from the UE or from another network node; and
      use the obtained refined UE location information to identify an appropriate client node.

2. The network node according to claim 1, further comprising:
   a language determining circuit configured to determine whether spoken language consistency is required between the UE and the client node.

3. The network node according to claim 1, wherein the processor circuit is further configured to determine whether refined UE location information is needed by performing at least one of:
   determining whether the received text message comprises a time stamp and whether time elapsed from the time indicated by the time stamp is above a predefined time threshold; and
   determining whether the location information fulfills an accuracy requirement.

4. The network node according to claim 1, wherein:
   the receiver circuit is further configured to receive a request for refined location information from the client node;
   the processor circuit is further configured to obtain refined location information from the UE or from a positioning network node; and
   the transmitter circuit is further configured to forward the obtained refined location information to the client node, enabling the client node to use the refined location information to set up or continue the communication with the UE.

5. The network node according to claim 1, wherein:
   the receiver circuit is further configured to receive a request for refined location information from the client node;
   the processor circuit is further configured to obtain refined location information from the UE or from a positioning network node, and to identify an appropriate client node based on the obtained refined location information; and
   the transmitter circuit is configured to forward the text message to the appropriate client node enabling the appropriate client node to set up the communication to the UE.

6. The network node according to claim 1, wherein the processor circuit is further configured to utilize a mapping procedure or a look-up table to identify the client node.

7. The network node according to claim 5, wherein the processor circuit is further configured to identify the appropriate client node based on at least one of a geographical location principle and spoken language capabilities of the appropriate client node.

8. The network node according to claim 2, wherein the spoken language determining circuit is further configured to determine whether language translation is needed and to determine whether the text message includes a spoken language indicator indicating which spoken language is supported or preferred by the UE.

9. The network node according to claim 8, wherein the spoken language determining circuit is further configured to determine whether the language translation is needed by utilizing a text recognition procedure, and when upon determining that a translation is needed, performing a translation to a spoken language supported by the identified client node.

10. The network node according to claim 1, wherein the text message comprises location information relating to one or more of the following:
    serving cell identity;
    cell identification for one or more other cells;
    network identification or network name;
    location information is a civic address;
    UE position information obtained by aid of a positioning method; and
    radio signal measurements performed by the UE.

11. The network node according to claim 1, wherein the client node is a location services client, an emergency center, or a public safety answering point.

12. The network node according to claim 1, wherein the processor circuit is further configured to determine whether the received text message or additional short status messages received in relation to the received text message, include one or more of the following information fields:
    a session identifier;
    a UE identifier;
    a UE device identifier;
    a subscription identifier;
    an emergency identifier;
    a UE type identifier;
    UE capabilities information related to positioning;
    information relating to UE power consumption or current battery energy state for the UE;
    an end-user indicator or a set of end-user indicators indicating end-user communication or moving ability;
    a service type indicator;
    a client type indicator; and at least one communication indicator indicating a preferred way of communication or reply; and when one or more of the information fields is included, use the one or more information fields to identify the client node.

13. A User Equipment (UE) for enabling a client node to set up a communication to the UE in a wireless communications network, the UE comprising:
  a UE processor circuit configured to acquire UE geographic location information and to include the acquired UE geographic location information and a client type indicator in a text message;
  a UE transmitter circuit configured to transmit the text message to a network node, the message including the acquired UE geographic location information and a client type indicator, wherein the client node is of a type indicated by the client type indicator, and the client node serves an area in which the UE is located; and
  a UE receiver circuit configured to receive a call back or a request to set up the communication from a client node identified by the network node based on information in the transmitted text message;
  wherein:
    the UE receiver circuit is further configured to receive a request from the client node for refined UE location information;
    the UE processor circuit is further configured to obtain the UE refined location information from another network node; and
    the UE transmitter circuit is further configured to transmit the obtained UE refined location information to the client node.

14. A User Equipment (UE) for enabling a client node to set up a communication to the UE in a wireless communications network, the UE comprising:
  a UE processor circuit configured to acquire UE geographic location information and to include the acquired UE geographic location information and a client type indicator in a text message;
  a UE transmitter circuit configured to transmit the text message to a network node, the message including the acquired UE geographic location information and a client type indicator, wherein the client node is of a type indicated by the client type indicator, and the client node serves an area in which the UE is located; and
  a UE receiver circuit configured to receive a call back or a request to set up the communication from a client node identified by the network node based on information in the transmitted text message;
  wherein:
    the UE receiver circuit is further configured to receive a request from the client node for refined UE location information;
    the UE processor circuit is further configured to perform a positioning procedure for determining the refined UE location information; and
    the UE transmitter circuit is further configured to transmit the determined refined UE location information to the client node as a response to the request.

15. The UE according to claim 14, wherein the UE processor circuit is further configured to:
  include in the text message or in additional short status messages to be sent in relation to the text message, one or more of the following information fields:
  a session identifier;
  a UE identifier;
  a UE device identifier;
  a subscription identifier;
  an emergency identifier;
  a UE type identifier;
  UE capabilities information related to positioning;
  information relating to UE power consumption or current battery energy state for the UE;
  an end-user indicator or a set of end-user indicators indicating end-user communication or moving ability; and
  at least one communication indicator indicating a preferred way of communication or reply.

16. A client node for setting up a communication to a User Equipment (UE) in a wireless communications network, the client node comprising:
  a client node receiver circuit configured to receive a text message originating from the UE, the text message including UE geographic location information;
  a client node processor circuit configured to determine whether spoken language consistency is required between the UE and the client node, based on the UE geographic location information; and
a communication circuit configured to set up a communication to the UE based on the UE geographic location information received in the text message and on the determined spoken language consistency;
  wherein:
    the client node processor circuit is further configured to determine whether the client node is an appropriate client node for communicating with the UE, based on the UE location information or based on an identified spoken communication language; and
    when the client node is determined to be an appropriate client node, the communication circuit is further configured to set up the communication to the UE.

17. A client node for setting up a communication to a User Equipment (UE) in a wireless communications network, the client node comprising:
  a client node receiver circuit configured to receive a text message originating from the UE, the text message including UE geographic location information;
  a client node processor circuit configured to determine whether spoken language consistency is required between the UE and the client node, based on the UE geographic location information; and
a communication circuit configured to set up a communication to the UE based on the UE geographic location information received in the text message and on the determined spoken language consistency;
  wherein, the client node processor circuit is further configured to determine whether refined UE location information is needed, and when refined UE location information is needed, to obtain refined UE location information from the UE or from a network node and to use the obtained refined UE location information for identifying whether the client node is an appropriate node.

18. The client node according to claim 16, wherein the communication circuit is configured to set up the communication to the UE by calling the UE or sending a response text message to the UE.

19. The client node according to claim 18, wherein the communication circuit is configured to set up a communication with the UE in a spoken language consistent with the spoken language used or indicated by the UE in the text message.

* * * * *